United States Patent
Ahmad et al.

(10) Patent No.: US 10,949,583 B2
(45) Date of Patent: Mar. 16, 2021

(54) SYSTEM AND METHOD FOR THERMO-FLUID MANAGEMENT OF CONDITIONED SPACE

(71) Applicant: Tata Consultancy Services Limited, Mumbai (IN)

(72) Inventors: Dilshad Ahmad, Pune (IN); Hrishikesh Nilkanth Kulkarni, Pune (IN); Anirudh Deodhar, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 345 days.

(21) Appl. No.: 16/310,757

(22) PCT Filed: Jun. 8, 2017

(86) PCT No.: PCT/IB2017/053386
§ 371 (c)(1),
(2) Date: Dec. 17, 2018

(87) PCT Pub. No.: WO2017/216687
PCT Pub. Date: Dec. 21, 2017

(65) Prior Publication Data
US 2019/0332730 A1    Oct. 31, 2019

(30) Foreign Application Priority Data
Jun. 16, 2016  (IN) .............................. 201621020683

(51) Int. Cl.
*G06F 30/20* (2020.01)
*G06F 30/13* (2020.01)
*G06F 119/08* (2020.01)

(52) U.S. Cl.
CPC .............. *G06F 30/20* (2020.01); *G06F 30/13* (2020.01); *G06F 2119/08* (2020.01)

(58) Field of Classification Search
CPC ....... G06F 30/20; G06F 30/13; G06F 2119/08
See application file for complete search history.

(56) References Cited

U.S. PATENT DOCUMENTS

| | | |
|---|---|---|
| 2006/0056732 A1 | 3/2006 | Holmes |
| 2011/0060561 A1 | 3/2011 | Lugo et al. |
| 2015/0142393 A1 | 5/2015 | van den Berghe |

OTHER PUBLICATIONS

International Search Report dated Oct. 10, 2017, in International Application PCT/162017/053386; 2 pages.
Written Opinion dated Oct. 10, 2017, in International Application PCT/IB2017/053386; 10 pages.

*Primary Examiner* — Anthony Ho
(74) *Attorney, Agent, or Firm* — Finnegan, Henderson, Farabow, Garrett & Dunner, LLP

(57) ABSTRACT

This disclosure relates generally to conditioned spaces, and more particularly to a system and method for thermo-fluid management in the conditioned space. In one embodiment, the method includes retrieving geometry and operational information of the conditioned space from a conditioned space data. A 3D geometry of the conditioned space is automatically generated in a format suitable for a mesh generation model for numerical analysis by parsing the conditioned space data. A mesh is created within the 3D geometry using the mesh generation model. A simulation data is generated based at least on an operational data of the plurality of components. The simulation data is applied on the mesh to simulate a thermo-fluid model of the conditioned space.

13 Claims, 6 Drawing Sheets

SYSTEM AND METHOD FOR THERMO-FLUID MANAGEMENT OF CONDITIONED SPACE

CROSS-REFERENCE TO RELATED PATENT APPLICATIONS

This is a U.S. National Stage under 35 U.S.C. § 371 and claims priority to International Application No. PCT/IB2017/053386, filed Jun. 8, 2017, which claims priority under 35 U.S.C. § 119 to (Indian Application No. 201621020683, filed in India on Jun. 16, 2016. The entire contents of the aforementioned application are incorporated herein by reference.

TECHNICAL FIELD

The present disclosure in general relates to conditioned spaces such as data centres, and particularly, but not exclusively, to system and method for thermo-fluid management of a conditioned space.

BACKGROUND

A data centre is a facility that is used to house Information Technology (IT) equipment and computer systems with associated components, such as telecommunication equipment, networking equipment and storage systems, and the like. The IT equipment may be arranged on racks or frames in the data centre. The IT equipment may generate heat as a result of being utilized for processing of various actions and tasks. The heat generated by the IT components may therefore need to be compensated/dissipated in order to avoid heating or generating a hot-spot in the data centre.

Data centres consume lot of power, by two main usages, namely, power required to run the equipment and power required to cool the equipment. In order to bring down cooling costs of data centres, it is preferred to design and run the data centre in thermally optimum way. Therefore, a thermal analysis of the entire data centre may ensure optimum thermal performance of the data centre.

SUMMARY

Embodiments of the present disclosure present technological improvements as solutions to one or more of the above-mentioned technical problems recognized by the inventors in conventional systems. For example, in one embodiment, a processor-implemented method for thermo-fluid management of a conditioned space is provided. The method includes obtaining, via one or more hardware processors, a data input file comprising conditioned space data associated with the conditioned space. Further, the method includes automatically generating a 3D geometry of the conditioned space in a format suitable for a mesh generation model for numerical analysis, via the one or more hardware processors, wherein automatically generating the 3D geometry for numerical analysis comprises parsing the conditioned space data to obtain a geometrical data associated with the plurality of components of the conditioned space, wherein the geometrical data represents the plurality of components by a plurality of points, a plurality of lines and a plurality of surfaces with corresponding naming conventions, and creating, based on the parsed geometrical data, the 3D geometry of the conditioned space having the plurality of components in the format suitable for a mesh generation tool for numerical analysis. Also, the method includes creating a mesh within the 3D geometry using the mesh generation tool, via the one or more hardware processors. Moreover, the method includes generating simulation data based at least on an operational data of the plurality of components, via the one or more hardware processors, the operational data representative of operational specifications of the plurality of components. Additionally, the method includes applying the simulation data on the mesh to simulate a thermo-fluid model of the conditioned space, via the one or more hardware processors.

In another embodiment, a system for thermo-fluid management of a conditioned space is provided. The system includes one or more memories storing instructions; and one or more hardware processors coupled to the one or more memories. The one or more hardware processors are configured by said instructions to obtain a data input file comprising conditioned space data associated with the conditioned space. The one or more hardware processors are configured by said instructions to automatically generate a 3D geometry of the conditioned space in a format suitable for a mesh generation model for numerical analysis. To automatically generating the 3D geometry for numerical analysis, the one or more hardware processors are configured by said instructions to parse the conditioned space data to obtain a geometrical data associated with the plurality of components of the conditioned space, wherein the geometrical data represents the plurality of components by a plurality of points, a plurality of lines and a plurality of surfaces with corresponding naming conventions, and create, based on the parsed geometrical data, the 3D geometry of the conditioned space having the plurality of components in the format suitable for the mesh generation model. Further, the one or more hardware/software processors are configured by said instructions to create a mesh within the 3D geometry using the mesh analysis. Furthermore, the one or more hardware/software processors are configured by said instructions to generate simulation data based at least on an operational data of the plurality of components, the operational data representative of operational specifications of the plurality of components. Also, the one or more hardware/software processors are configured by said instructions to apply the simulation data on the mesh to simulate a thermo-fluid model of the conditioned space.

In yet another embodiment, a non-transitory computer-readable medium having embodied thereon a computer program for executing a method for thermo-fluid management of a conditioned space is provided. The method includes obtaining, via one or more hardware processors, a data input file comprising conditioned space data associated with the conditioned space. Further, the method includes automatically generating a 3D geometry of the conditioned space in a format suitable for a mesh generation model for numerical analysis, via the one or more hardware processors, wherein automatically generating the 3D geometry for numerical analysis comprises parsing the conditioned space data to obtain a geometrical data associated with the plurality of components of the conditioned space, wherein the geometrical data represents the plurality of components by a plurality of points, a plurality of lines and a plurality of surfaces with corresponding naming conventions, and creating, based on the parsed geometrical data, the 3D geometry of the conditioned space having the plurality of components in the format suitable for a mesh generation tool for numerical analysis. Also, the method includes creating a mesh within the 3D geometry using the mesh generation tool, via the one or more hardware processors. Moreover, the method includes generating simulation data based at least on an operational data of the plurality of components, via the one or more hardware processors, the operational data representative of operational specifications of the plurality of components. Additionally, the method includes applying the simulation data on the mesh to simulate a thermo-fluid model of the conditioned space, via the one or more hardware processors.

BRIEF DESCRIPTION OF DRAWINGS

The detailed description is described with reference to the accompanying Figures. In the Figures, the left-most digit(s) of a reference number identifies the Figure in which the reference number first appears. The same numbers are used throughout the drawings to refer like/similar features and components.

DETAILED DESCRIPTION

Figure 1:
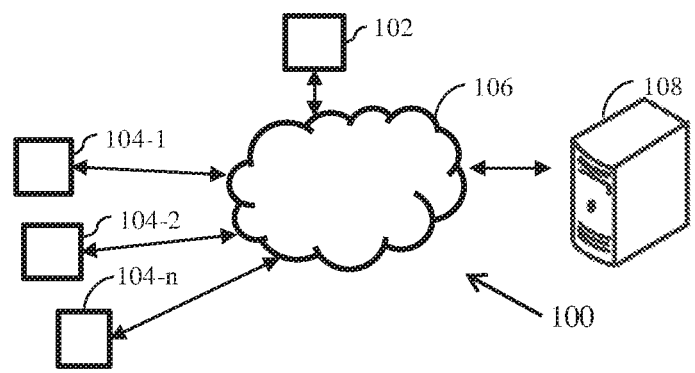
FIG. 1 illustrates a networking environment implementing a system for thermo-fluid management of a conditioned space according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Conventionally, the thermal analysis of the data centre may be accomplished by various techniques. Amongst the available techniques of the thermal analysis of the data centre, numerical simulation technique such as computational fluid dynamics (CFD) is effective in providing meaningful insights. For example, a CFD model based on thermal mass and energy balance principles can simulate the data centre for predicting energy consumption, pressure and temperature to a great accuracy. A typical CFD simulation involves creation of geometry of interest, creation of mesh (numerical three dimensional grid) inside the geometry, solution of governing equation on the generated mesh and finally analysis of the generated results.

In conventional methods for analysis of a data centre, once data is collected through data collection tool/software it require manual effort and CFD expertise to convert it into a format ready for CFD simulation. In a conventional system, a two dimensional layout of the data centre is prepared by utilizing available tools, for instance an Asses tool. The details of the Asses tool are provided in Indian patent application (Application number 3758/MUM/2013). The Asses tool is also equipped with details of standard components of a data centre such as Rack, CRAC and Tile, and so on. Apart from the layout information associated with the structure of the data centre and various components situated therein, the assess tool also captures operational information of different components such as thermal power of a server, set of points of CRACs and percentage opening of components such as Tile, and so on. In present practice, a CFD expert may read all the details captured in the Asses tool and manually create geometry of the data centre using a computer aided design (CAD) tool. Further, using the expertise in CFD, the expert manually creates a mesh inside the created geometry, by for example, by utilizing a known meshing tool. Once the mesh of the geometry is created, a further expertise in a CFD tool is required to carry out the simulation and analysis of the data so as to take operational decisions regarding the data centre. As seen herein, in the conventional methods for data centre analysis, various process steps such as geometry creation, mesh generation, simulation and analysis are a repetitive. Moreover, each process steps requires manual intervention by an expert, for instance a CFD experts and/or an expert in mesh creation, and so on. Accordingly, the conventional method for analysis and management of a data centre are cumbersome and requires substantial manual effort.

Various embodiments of the present disclosure disclosed method and system for automating the entire manual process of thermo-fluid management of conditioned space. The conditioned space may include a data centre. In an embodiment, the method for thermo-fluid management includes parsing data associated with conditioned space into a meaningful format for the components of the conditioned space. Said data is then converted into a geometrical format representing points, lines and surfaces with appropriate naming conventions adopted therefor. The data in geometrical format is converted to a 3D geometry of the conditioned space with the components represented within it. Herein, it will be noted that the 3D geometry of the conditioned space is generated in a format suitable for a mesh analysis and computational fluid dynamics (CFD) analysis. For instance, the 3D geometry of the conditioned space is generated in a format compatible with proprietary tools such as Ansys ICEM CFD, OpenFOAM snappyHexMesh, Ansys CFX and Ansys Fluent, and so on. The format of the geometry is made in 3D surface format such as obj and stl.

A detailed description of the above described thermo-fluid management is shown with respect to flow diagrams represented with reference to FIGS. 1 through 8.

The method(s) and system(s) for thermo-fluid management of a conditioned space are further described in conjunction with the following figures. It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

FIG. 1 illustrates a network environment 100 implementing a thermo-fluid management system 102 for a conditioned space, according to an embodiment of the present subject matter. The thermo-fluid management system 102, hereinafter referred to as the system 102, is configured for automation of steps involved required in the analysis required to carry out the thermo-fluid management of a conditioned space such as a data centre. The system 102 may be embodied in a computing device, for instance a computing device 104. In an implementation, the system 102 is implemented within a data centre. Alternatively, the system 102 can be implemented outside of the data centre. The data centre can be associated with an Information Technology (IT)/software firm.

Although the present disclosure is explained considering that the system 102 is implemented on a server, it may be understood that the system 102 may also be implemented in a variety of computing systems, such as a laptop computer, a desktop computer, a notebook, a workstation, a cloud-based computing environment and the like. In one implementation, the system 102 may be implemented in a cloud-based environment. It will be understood that the system 102 may be accessed by multiple users through one or more user devices 106-1, 106-2 . . . 106-N, collectively referred to as user devices 106 hereinafter, or applications residing on the user devices 106. Examples of the user devices 106 may include, but are not limited to, a portable computer, a personal digital assistant, a handheld device, a Smartphone, a Tablet Computer, a workstation and the like. The user devices 106 are communicatively coupled to the system 102 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112. The components and functionalities of the system 102 are described further in detail with reference to FIG. 2.

Figure 2:
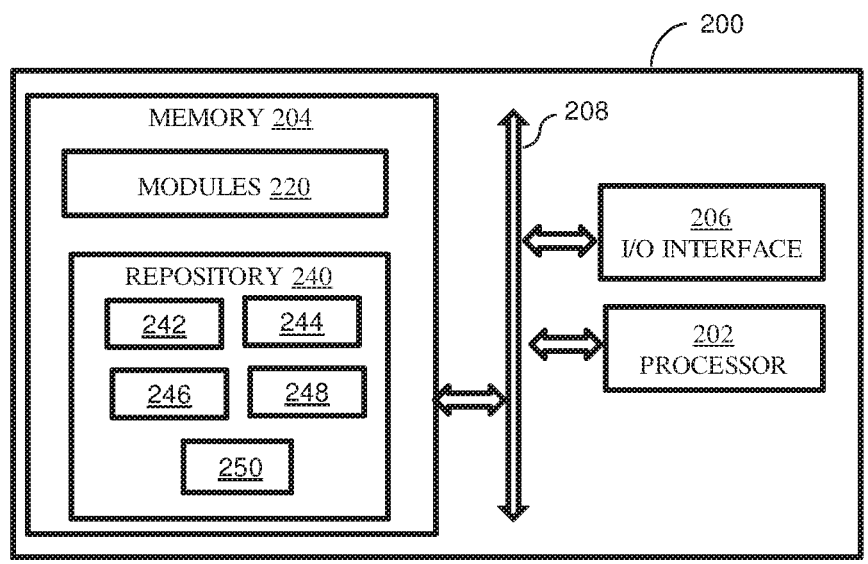
FIG. 2 illustrates a block diagram of a thermo-fluid management system according to some embodiments of the present disclosure.

FIG. 2 illustrates a block diagram of a thermo-fluid management system 200, in accordance with an example embodiment. The thermo-fluid management system 200 (hereinafter referred to as system 200) may be an example of the system 102 (FIG. 1). In an example embodiment, the system 200 may be embodied in, or is in direct communication with the system, for example the system 102 (FIG. 1). In an embodiment, the system 200 facilitates in automatic analysis of the thermo-fluid management of a conditioned space such as a data centre. The system 200 includes or is otherwise in communication with one or more hardware processors such as a processor 202, at least one memory such as a memory 204, and an I/O interface 206. The processor 202, memory 204, and the I/O interface 206 may be coupled by a system bus such as a system bus 208 or a similar mechanism.

The I/O interface 206 may include a variety of software and hardware interfaces, for example, a web interface, a graphical user interface, and the like The interfaces 206 may include a variety of software and hardware interfaces, for example, interfaces for peripheral device(s), such as a keyboard, a mouse, an external memory, a camera device, and a printer. Further, the interfaces 206 may enable the system 102 to communicate with other devices, such as web servers and external databases. The interfaces 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 206 may include one or more ports for connecting a number of computing systems with one another or to another server computer. The I/O interface 206 may include one or more ports for connecting a number of devices to one another or to another server.

The hardware processor 202 may be implemented as one or more microprocessors, microcomputers, microcontrollers, digital signal processors, central processing units, state machines, logic circuitries, and/or any devices that manipulate signals based on operational instructions. Among other capabilities, the hardware processor 202 is configured to fetch and execute computer-readable instructions stored in the memory 204.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes a plurality of modules 220 and a repository 240 for storing data processed, received, and generated by one or more of the modules 220. The modules 220 may include routines, programs, objects, components, data structures, and so on, which perform particular tasks or implement particular abstract data types.

The repository 240, amongst other things, includes a system database 242 and other data 244. The other data 244 may include data generated as a result of the execution of one or more modules in the other modules 230. The repository 240 is further configured to maintain a conditioned space data 246. The conditioned space data 246 may geometrical data 248 of the conditioned space and operational data 250 of the plurality of components of the conditioned space. The details of the conditioned space data 246, geometrical data 248 and the operational data 250 are described further in detail below.

According to the present subject matter, the system 200 performs thermo-fluid management in a conditioned space, for example, the data centre. In an embodiment, the system 200 automatically generates a 3D geometry of the conditioned space in a format suitable for a mesh generation tool, and subsequently for a numerical simulation tool. In an embodiment, to generate the 3D geometry of the conditioned space, the system 200 obtains a data input file having the conditioned space data associated with the conditioned space.

In an embodiment, the conditioned space data 246 includes the geometrical data 248 of the conditioned space and operational data 250 of the plurality of components in a text format. The geometrical data 248 of the conditioned space may include information associated with layout and design of the conditioned space 246. In an embodiment, the geometrical data may represents the plurality of components by a plurality of points, a plurality of lines and a plurality of surfaces with corresponding naming conventions. The geometrical data of the components such as Room, Rack and CRAC my include x-y coordinates of room, Rack and CRAC boundaries and heights of room, Rack and CRAC. The operational data 250 of the conditioned space 246 is representative of operational specifications of the plurality of components of the conditioned space. The operational data 250 may include heat loads of Racks and flow rates of CRACs and Racks. The conditioned space data 246 may be embodied in a text format in the data input file. Said file may be generated by a tool developed to capture the geometrical and operational details of any conditioned space in a predefined format. Example of a tool capable of generating the geometrical and operational details of the conditioned space may include Power Insight Asses tool, as described earlier. It will be noted that without limiting the scope of embodiments described herein, the conditioned space data 246 may be obtained from any data capturing tool that is configured to capture data for a conditioned space.

The system 200 generates a numerical grid (or mesh) associated with the configuration of the conditioned space based on the geometry information 246 and the operational information 248. Herein, the numerical grid is representative of a simulation ready grid inside the entire conditioned space. The numerical grid is generated by slicing the space of the data centre with lines in x, y and z directions such that space is filled with nodes both inside and on the space boundary.

In an embodiment, to create the numerical grid, the system 200 automatically generates the 3D geometry of the conditioned space in a format suitable for a mesh analysis, via the processor 202. Typically, the data input file obtained from the tool capable of generating the conditioned space data is in a format which may not be directly consumable for 3D geometry of the conditioned space. For instance, in such data input file, the geometrical data and the operational may not be segregated easily. Accordingly, in order to automatically generate the 3D geometry of the conditioned space, the system 200 parses the conditioned space data 246 corresponding to the plurality components of the conditioned space, so as to obtain the geometrical data 248. In an embodiment, said parsing may be performed based on a set of rules. In an embodiment, the set of rules may be associated with key words corresponding to each component that may appear in the data file and each key word may be associated with either geometry or the operational parameters of the conditioned space. Based on the keywords a rule may be executed to perform the intended task of parsing data. In one embodiment the keyword used in data file for CRAC is "DataCenterCracProperties". Extracting geometrical and operational data for CRAC includes searching for said keyword in the data file and extracting properties with names. For example in order to extract 'height of the CRAC' value corresponding to keyword "crac_height" is extracted. In an embodiment, the set of rule for parsing for geometrical and operational data may be hard coded in a text file. Alternatively, the rules may be generated by updating the pre-stored rules. Based on the rules, the system 200 parses the conditioned space data to obtain the geometrical data and the operational data. An example of parsing the conditioned space data is described further with reference to FIG. 4. Based on the geometrical data 248, the system 200 creates the 3D geometry of the conditioned space having the plurality of components.

The system is caused to create a mesh within the 3D geometry using the mesh generation tool. Herein, since the 3D geometry is generated in a format that is compatible for the mesh generation. In an embodiment, the mesh generation tool may include Ansys ICEMCFD, Ansys mesher or OpenFOAM snappyHexMesh. In an alternate embodiment, the mesh analysis may be performed meshing tools, for example, snappyHexMesh, a mesh generation tool available in OpenFOAM. The meshing of the 3D geometry generates a numerical grid inside the 3D geometry.

The system 200 configures simulation ready input files for the simulation tool based on the numerical grid. In an embodiment, the system generates simulation data based on the operational data of the plurality of components. For instance, the system 200 parses the conditioned space data to extract the operational data 604 corresponding to various components. For instance, the operational data may include thermal and flow related data associated with the components. The system 200 converts the operational data into fluid dynamics simulation ready format so as to configure the simulation ready input files. The fluid dynamics simulation ready format may include data such as normal velocity, mass flow rate and temperature at different boundary surfaces and internal domains, and so on.

The system 200 configures the simulation ready input files for thermo-fluid simulations of the conditioned space using a computational fluid dynamics (CFD) tool. Examples of CFD tools may include, but are not limited to, Ansys Fluent, Ansys CFX, OpenFOAM, and so on. Furthermore, the system 200 prepares post processing files for final results by extracting simulated data into meaningful number. An example high-level flow diagram of the process of thermo-fluid management of the conditioned space is explained further with reference to FIG. 3

Figure 3:
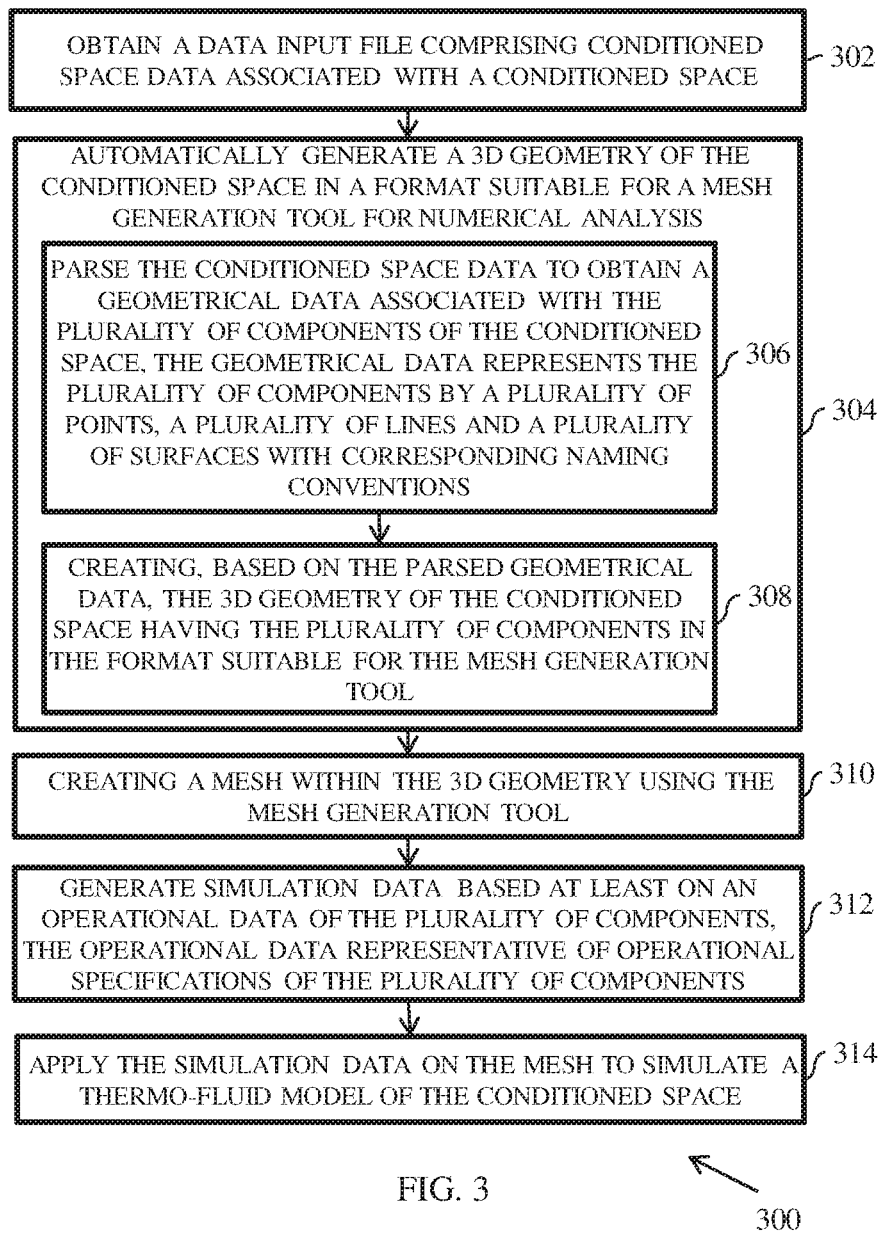
FIG. 3 illustrates a flowchart of a method for thermo-fluid management in a conditioned space according to some embodiments of the present disclosure.

FIG. 3 illustrates a flowchart of a method 300 for thermo-fluid management in a conditioned space, in accordance with an example embodiment. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof.

In an embodiment, the method 300 depicted in the flow chart may be executed by a system, for example, the system 200 of FIG. 2. In an example embodiment, the system 200 may be embodied in a computing device, for example, the computing device 104 (FIG. 1).

At 302, the method 300 includes obtaining a data input file having conditioned space data associated with the conditioned space. As described with reference to FIG. 2, the conditioned space data may be obtained from a tool capture the geometrical and operational details of any conditioned space.

At 304, the method 300 includes automatically generating a 3D geometry of the conditioned space in a format suitable for a mesh generation and CFD analysis. In an embodiment, the method for generating the 3D geometry of the conditioned space includes parsing the conditioned space data to obtain a geometrical data associated with the plurality of components of the conditioned space, at 306. In an embodiment, said parsing may be performed based on a set of rules. In an embodiment, the set of rules may be associated with key words corresponding to each component that may appear in the data file and each key word may be associated with either geometry or the operational parameters of the conditioned space. Based on the keywords a rule may be executed to perform the intended task of parsing data. In an embodiment, the set of rule for parsing for geometrical and operational data may be hard coded in a text file. Alternatively, the rules may be generated by updating the pre-stored rules. Based on the rules, the system 200 parses the conditioned space data to obtain the geometrical data and the operational data. An example of parsing the conditioned space data is described further with reference to FIG. 4.

At 308, based on the geometrical data, the 3D geometry of the conditioned space is created having the plurality of components in the format suitable for a mesh analysis. In an embodiment, the data in geometrical format can be passed to a computer aided design (CAD) tool to create 3D geometry of the Data Centre with all the components inside it.

At 310, the method includes creating a mesh within the 3D geometry using the mesh analysis. Meshing of the 3D geometry generates numerical grid inside the 3D geometry space required for the numerical simulation for thermo-fluid modelling of the conditioned space. The generation of the numerical grid inside the conditioned space creates simulation ready grid inside the entire conditioned space. A detailed flow-diagram illustrating method for generation of the numerical grid inside the conditioned space is described further with reference to FIG. 4.

At 312, the method 300 includes generating simulation data based at least on an operational data of the plurality of components. The operational data representative of operational specifications of the plurality of components. At 314, the method 300 includes applying the simulation data on the mesh to simulate a thermo-fluid model of the conditioned space in a format suitable for CFD analysis.

At 306, the method 300 includes preparation of simulation ready input files for simulation tool. The preparation of simulation ready input files for simulation tool covers the preparation of simulation ready file for thermo-physical simulations of the conditioned space using any of computational fluid dynamics tool used for the purpose. At 308, the method 300 includes preparing post-processing files for final results.

Figure 4:
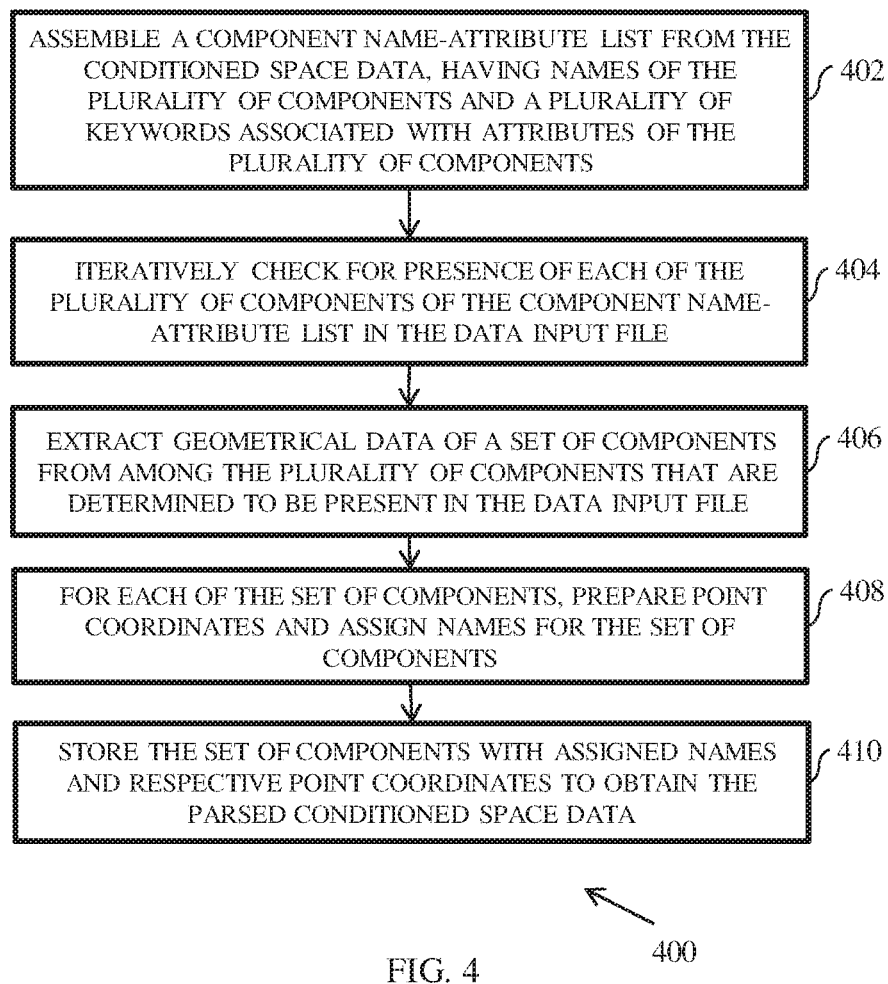
FIG. 4 illustrates a flow diagram of a method for parsing conditioned space data to obtain geometrical data according to some embodiments of the present disclosure.

FIG. 4 illustrates a flow diagram of a method 400 for parsing conditioned space data to obtain geometrical data, in accordance with an example embodiment.

In an embodiment, to parsing the conditioned space data, various repeated geometrical features of the conditioned space are identified. Said repeated geometrical features may be grouped into components to form a list. Additionally, keywords appearing in the data input file, such as coordinates of corner point, length, width, height, and so on are also listed along with the names of each component. So, at step 402 of method 400, a component name-attribute list is assembled (or collated) from the conditioned space data. The component name-attribute list includes names of the plurality of components and a plurality of keywords associated with attributes of the plurality of components. For instance, the components are named as ROOM for outer boundary of the conditioned space. Herein it will be noted that the component name-attribute list may be assembled prior to parsing. Alternatively, said list can be assembled as a first step of parsing, as indicated by 402 of method 400.

At 404, the method 400 includes iteratively checking for presence of each of the plurality of components of the component name-attribute list in the data input file. For example, the component name-attribute list may be accessed, and a component is selected therefrom. Thereafter, the data input file (in text format) may be accessed and the selected component may be searched in the data input file.

At 406, the method 400 includes extracting geometrical data of a set of components from among the plurality of components that are determined to be present in the data input file. In an embodiment, the geometrical data of the set of components may be extracted by using the geometry related keywords for the current component. At 408, the method 400 includes for each of the set of components, preparing point coordinates and assigning names for the set of components. At 410, the method 400 includes storing the set of components with assigned names and respective point coordinates to obtain the parsed conditioned space data. Herein, it will be noted that the process is repeated for all components present in the conditioned space. An example process flow for identification of coordinates and assign names is described further with reference to FIG. 5.

Figure 5:
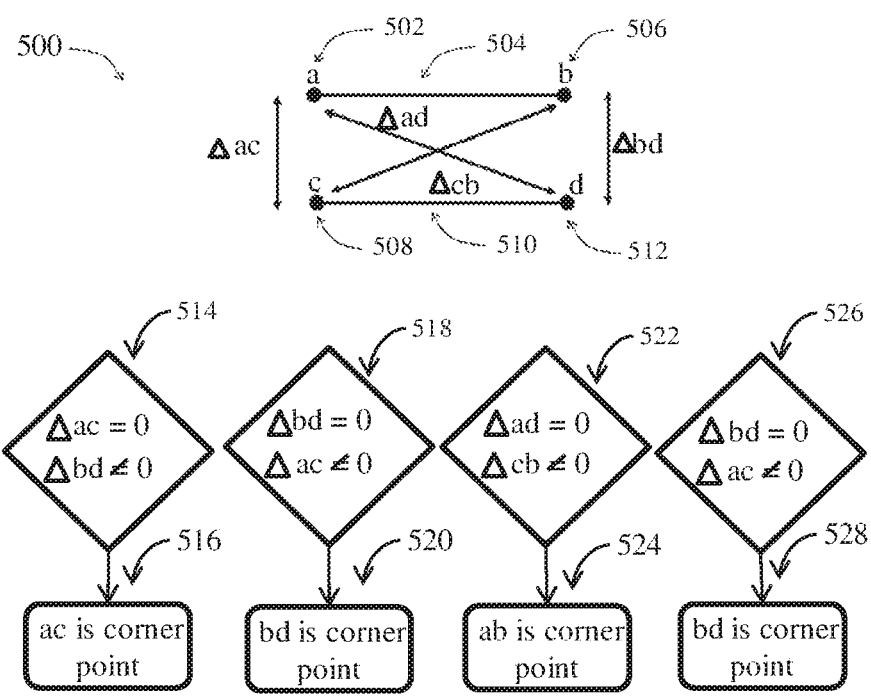
FIG. 5 illustrates a flow chart of a method for identification of coordinates and assigning names to said coordinates according to some embodiments of the present disclosure.

FIG. 5 illustrates an example representation of identification of coordinates and assigning names to said coordinates for creating the 3D geometry of a conditioned space, in accordance with an example embodiment. Coordinates of some components represent a polyline geometry and the order of coordinates of such components stored in the component name-attribute may not be in the order of actual physical geometry. So, in order to match the order of the point in the list, it is important to sort them. In an embodiment, to sort the points the system (for example, the system 200 of FIG. 2) may capture only the corner points, so as to eliminate intermediate points in a straight line. An example of capturing the corner point is described below.

In order to capture a corner point, a line pair is selected from the data input file and a distance measure is determined between corresponding end-points of the line pair. Referring to FIG. 5, a segment line ab 506 with point a (marked as 502) and point b (marked as 504) point is selected from the list of all the line segments present in the data input file in text format. It may be determined whether lines of the line pair have one common point based on the distance measure between end-points for the line pair. Herein, one non-zero distance measure and one zero distance measure between the end-points of the line pair is indicative of a corner point between the line pair. For example, the segment line ab (marked as 506) is compared with another line cd (marked as 512) with one end point c (marked as 508) and other end point d (marked as 510). The distance pair between the two ends of line ab (marked as 506) and line cd (marked as 512) namely (Δac, Δbd), and (Δad, Δcd) are calculated. Now if the two lines make a corner point then distance between one ends will be zero and the distance between the other two ends will be non-zero. For example, in possibility Δac (marked as 514)=0 and Δbd≠0 this gives result 516 as end a and end c make a corner point. Similarly in possibility 518, possibility 522 and possibility 526 result 520, result 524 and result 528 says point b and d, point a and b and point b and d as corner points. These corner points, again may not be stored in order as they come in the layout.

In order to arrange the corner points in order, each corner point of the plurality of corner points is arranged in an order of appearance in the conditioned space based on identification of a nearest point in a direction corresponding to the each corner point. For example, one corner is selected and nearest points in the possible direction from this point is selected. As all the points are the corner points, the new point becomes the next corner point in order it appears in actual geometry. This process of searching of points continues till the last corner point. This gives a list of all the corner points stored in the order they appear in the layout.

Figure 6:
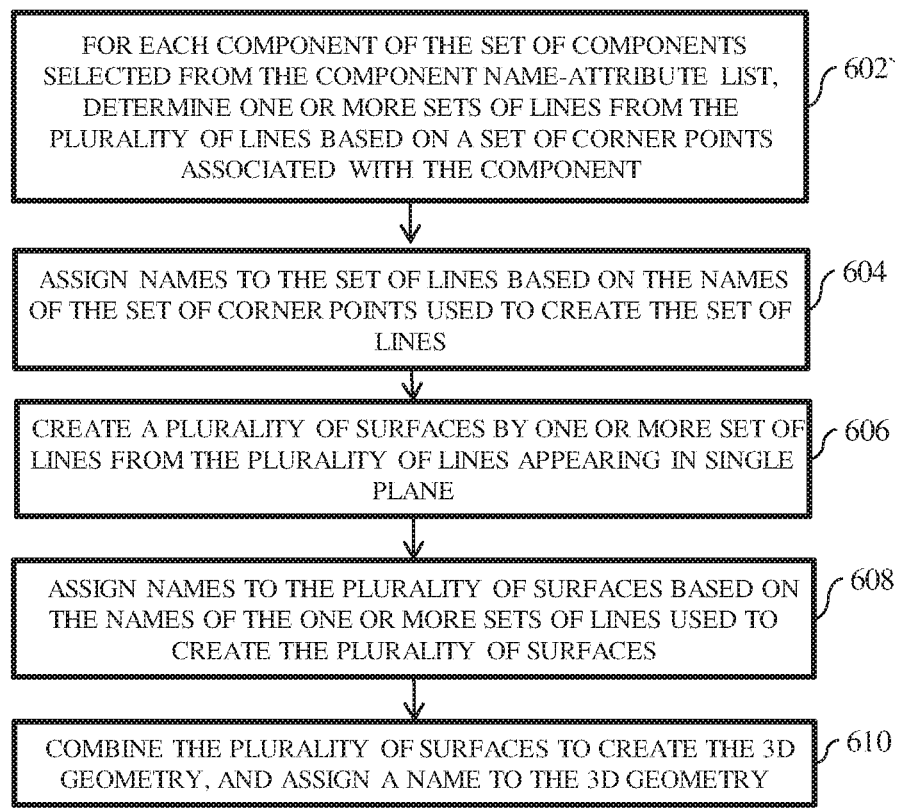
FIG. 6 illustrates a flow chart of a method for creating three dimensional geometry of the conditioned space according to some embodiments of the present disclosure.

FIG. 6 illustrates a flow chart of a method 600 for creating three dimensional (3D) geometry of the conditioned space, in accordance with an example embodiment. The component name-attribute list is received, at a time one component is selected from said list. For each component of the set of components, selected from the component name-attribute list (as described in FIG. 5), one or more sets of lines are selected based on a set of corner points associated with the component at 602. Also, names are assigned to the set of lines based on the names of the set of corner points used to create the set of lines, at 604. In particular, the lines are created and assigned names assigned based on the names of points used to make lines. In one embodiment corners making inlet of a CRAC AC1 are named as "AC1-INLET-Point01_1080_-300_0". Keyword "INLET" is associated for points having z-coordinate as minimum of all the possible z-coordinates. Similarly for a point lying on an outlet of a CRAC is named as "AC1-OUTLET-Point05_1080_-300_200". In a preferred embodiment the names of the lines are assigned based on the names of the points joining them. For example line joining AC1-INLET-Point01_1080_-300_0 and AC1-OUTLET-Point05_1080_-300_200 will be named as "Line 01: AC1-WALL-Line01_AC1-INLET-Point01_AC1-OUTLET-Point05_1080_-300_0->200".

Name of the line is decided based on the names of the points making them. In case both the points have same boundary type then line joining them will get same boundary name else name of the line will be given as "WALL"

At 606, the method 600 includes creating a plurality of surfaces by one or more set of lines from the plurality of lines appearing in single plane. Also, names are assigned to the plurality of surfaces based on the names of the one or more sets of lines used to create the plurality of surfaces, at 608. In one embodiment the name of the surface is derived from the names of the lines making the surface. In case the names of the lines are same then it will get same name as the name of the lines making them. In case the names of the lines making them are different then surface will get a name "WALL".

At 610, the method 600 includes combining the plurality of surfaces to create the 3D geometry, and assigning a name to the 3D geometry. As discussed previously, the 3D geometry created can be used to generate numerical grids in any meshing tool available for the purpose. In one implementation the 3D geometry is prepared in stereo lithography (stl) format and numerical grid is generated in snappyHexMesh, a mesh generation tool available in OpenFOAM.

Figure 7:
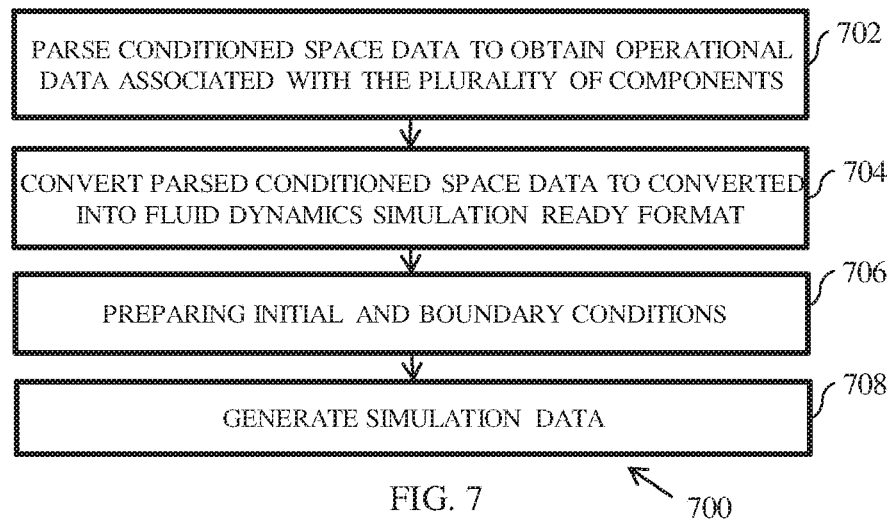
FIG. 7 illustrates a flow chart of a method for preparation of simulation ready input files for simulation tool according to some embodiments of the present disclosure.

FIG. 7 illustrates a flow chart of a method 700 for preparation of simulation ready input files for simulation tool. In an embodiment, the conditioned space data may be accessed from the data input file, and parsed to obtain operational data associated with the plurality of components at 702. Herein, parsing the input data file includes extracting operational data specific to various components such as thermal and flow related data. At 704, said data is converted into fluid dynamics simulation ready format such as normal velocity, mass flow rate and temperature at different boundary surfaces and internal domains. At 706, the method 700 includes preparing initial and boundary conditions. Said information is applied to the numerical grid and the simulation data (tool ready input file) is prepared at 708. This file can be passed to a CFD simulation tool to carry out the simulation process. In one embodiment initial and boundary conditions are prepared using set of rules based on physics of the Data Centre terminologies associated to CFD simulation for that physics. For example the component CRAC, has 3 types of boundary conditions to be applied at its boundaries, namely INLET, OUTLET and WALL. For WALL type of boundary condition for AC1, velocity values are specified as zero. Pressure is specified as gradient values equal to zero, temperature is specified as gradient values of zero. At INLET face velocity is specified in terms of mass flow rate. Gradient of a pressure values are specified zero and temperature specified as a finite value present in data file.

Figure 8:
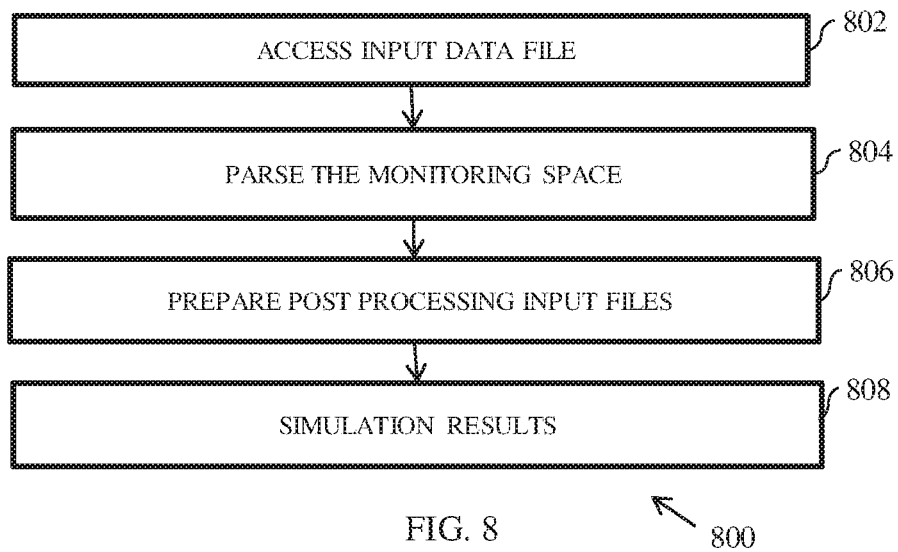
FIG. 8 illustrates a flow chart of a method for preparing post processing files for final results according to some embodiments of the present disclosure.

FIG. 8 illustrates a flow chart of a method 800 for preparing post processing simulation data, in accordance with an example embodiment. The preparation of post simulation data enables extraction of meaningful results from the simulation data for the conditioned space.

At 802, the method 800 includes accessing the data input file in text file format. The data input file in the text format is a data file containing geometry and operational data in text format. At 804, the method 800 includes parsing the file for monitoring space. Parsing the data input file includes parsing the data input file for spaces of interest inside the conditioned space. These spaces may include locations like areas near the inlet of thermal sources such as a server in case of conditioned space being a data centre. At 806, the method 800 includes preparing post processing simulation results based on the locations, and calculating thermo-fluid values such as average temperature. At 808, the method 800 includes prediction of thermo-fluid status of the conditioned space based on the analysis of the post processed results in an aggregate sense and making conclusive remarks on the current thermo-fluid status of the entire conditioned space. For example post-processing of the simulation results identifies presence of a region where hot air from a server is going back to same server again, thereby resulting in continuous heating of that air. Based on this finding it can be predicted that the conditioned space such as a data centre can have a hot-spot at the location of the recirculation and server affected with the re-circulation with always get a hot air irrespective of the AC supply temperature.

It will be noted herein the disclosed system and method for thermo-fluid management can be implemented with multiple layouts, namely cold plenum, room, hot plenum and containment panels by simultaneously working with multiple data files.

Various embodiments provide method and system for thermo-fluid management of conditioned spaces, such as data centres. A significant outcome of the disclosed method is that the method enables significant reduction in energy consumed in thermal management of the conditioned spaces, by optimized thermal management decisions obtained using various analysis techniques such as numerical simulation of conditioned space. The disclosed method allows automatic extraction of useful conditioned space data from input data file, and automatic creation of 3D geometry from said data. In addition, the method facilitates in automatic preparation of tool agnostic input files for CFD simulation. Post simulation, the resultant data is automatically analysed, thereby leading to elimination of manual effort involved in the analysis of thermo-fluid management of conditioned spaces.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A processor-implemented method for thermo-fluid management of a conditioned space having a plurality of components, the method comprising:
   obtaining, via one or more hardware processors, a data input file comprising conditioned space data associated with the conditioned space;
   automatically generating a 3D geometry of the conditioned space in a format suitable for a mesh generation model for numerical analysis, via the one or more hardware processors, wherein automatically generating the 3D geometry for numerical analysis comprises:
   parsing the conditioned space data to obtain a geometrical data associated with the plurality of components of the conditioned space, wherein the geometrical data represents the plurality of components by a plurality of points, a plurality of lines and a plurality of surfaces with corresponding naming conventions,
   creating, based on the parsed geometrical data, the 3D geometry of the conditioned space having the plurality of components in the format suitable for a mesh analysis;
   creating a mesh within the 3D geometry using the mesh generation model, via the one or more hardware processors;
   generating simulation data based at least on an operational data of the plurality of components, via the one or more hardware processors, the operational data representative of operational specifications of the plurality of components; and
   applying the simulation data on the mesh to simulate a thermo-fluid model of the conditioned space, via the one or more hardware processors,
   wherein creating the 3D geometry comprises obtaining a plurality of corner points from a plurality line pairs selected from the plurality of lines, and arranging each corner point of the plurality of corner points in an order of appearance in the conditioned space based on an identification of a nearest point in a direction corresponding to each corner point.

2. The method of claim 1, further comprising assembling a component name-attribute list from the conditioned space data, the component name-attribute list comprising names of the plurality of components and a plurality of keywords associated with attributes of the plurality of components.

3. The method of claim 2, wherein parsing the conditioned space data comprises:
iteratively checking for presence of each of the plurality of components of the component name-attribute list in the data input file;
extracting geometrical data of a set of components from among the plurality of components that are determined to be present in the data input file;
for each of the set of components, preparing point coordinates and assigning names for the set of components; and
storing the set of components with assigned names and respective point coordinates to obtain the parsed conditioned space data.

4. The method of claim 3, wherein obtaining the plurality of corner points comprises:
performing iteratively, for a plurality of line pairs selected from the plurality of lines:
selecting a line pair from the data input file and determining distance measure between corresponding end-points of the line pair; and
determining whether lines of the line pair have one common point based on the distance measure between end-points for the line pair, wherein one non-zero distance measure and one zero distance measure between the end-points of the line pair is indicative of a corner point between the line pair.

5. The method of claim 4, wherein creating the 3D geometry of the conditioned space further comprises:
performing iteratively for each component of the set of components selected from the component name-attribute list:
determining one or more sets of lines from the plurality of lines based on a set of corner points associated with the component, and assigning names to the set of lines based on the names of the set of corner points used to create the set of lines;
creating a plurality of surfaces by one or more set of lines from the plurality of lines appearing in single plane, and assigning names to the plurality of surfaces based on the names of the one or more sets of lines used to create the plurality of surfaces; and
combining the plurality of surfaces to create the 3D geometry, and assigning a name to the 3D geometry.

6. The method of claim 1, wherein
generating the simulation data comprises:
parsing the conditioned space data to obtain operational data associated with the plurality of components; and
converting the operational data into the format suitable for computational fluid dynamics (CFD) analysis.

7. A system for thermo-fluid management of a conditioned space having a plurality of components, the system comprising:
one or more memories storing instructions; and
one or more hardware processors coupled to the one or more memories, wherein said
one or more hardware processors are configured by said instructions to:
obtain a data input file comprising conditioned space data associated with the conditioned space;
automatically generate a 3D geometry of the conditioned space in a format suitable for a mesh generation model for numerical analysis, wherein to automatically generating the 3D geometry, the one or more hardware processors are configured by said instructions to:
parse the conditioned space data to obtain a geometrical data associated with the plurality of components of the conditioned space, wherein the geometrical data represents the plurality of components by a plurality of points, a plurality of lines and a plurality of surfaces with corresponding naming conventions,
create, based on the parsed geometrical data, the 3D geometry of the conditioned space having the plurality of components in the format suitable for a mesh analysis;
create a mesh within the 3D geometry using the mesh generation model;
generate simulation data based at least on an operational data of the plurality of components, the operational data representative of operational specifications of the plurality of components; and
apply the simulation data on the mesh to simulate a thermo-fluid model of the conditioned space,
wherein creating the 3D geometry comprises obtaining a plurality of corner points from a plurality line pairs selected from the plurality of lines, and arranging each corner point of the plurality of corner points in an order of appearance in the conditioned space based on an identification of a nearest point in a direction corresponding to each corner point.

8. The system of claim 7, wherein the one or more hardware processors are further configured by the instructions to assemble a component name-attribute list from the conditioned space data, the component name-attribute list comprising names of the plurality of components and a plurality of keywords associated with attributes of the plurality of components.

9. The system of claim 8, wherein to parse the conditioned space data, the one or more hardware processors are further configured by the instructions to:
iteratively check for presence of each of the plurality of components of the component name-attribute list in the data input file;
extract geometrical data of a set of components from among the plurality of components that are determined to be present in the data input file;
for each of the set of components, prepare point coordinates and assigning names for the set of components; and
store the set of components with assigned names and respective point coordinates to obtain the parsed conditioned space data.

10. The system of claim 9, wherein to obtain the plurality of corner points comprises, the one or more hardware processors are further configured by the instructions to:
perform iteratively, for a plurality of line pairs selected from the plurality of lines:
select a line pair from the data input file and determining distance measure between corresponding end-points of the line pair; and
determine whether lines of the line pair have one common point based on the distance measure between end-points for the line pair, wherein one non-zero distance measure and one zero distance measure between the end-points of the line pair is indicative of a corner point between the line pair.

11. The system of claim 10, wherein to create the 3D geometry of the conditioned space, the one or more hardware processors are further configured by the instructions to:
perform iteratively for each component of the set of components selected from the component name-attribute list:
determine one or more sets of lines from the plurality of lines based on a set of corner points associated with the component, and assign names to the set of lines based on the names of the set of corner points used to create the set of lines;
create a plurality of surfaces by one or more set of lines from the plurality of lines appearing in single plane, and assign names to the plurality of surfaces based on the names of the one or more sets of lines used to create the plurality of surfaces; and
combine the plurality of surfaces to create the 3D geometry, and assign a name to the 3D geometry.

12. The system of claim 7, wherein to generate the simulation data, the one or more hardware processors are further configured by the instructions to:
parse the conditioned space data to obtain operational data associated with the plurality of components; and
convert the operational data into the format suitable for computational fluid dynamics (CFD) analysis.

13. A non-transitory computer-readable medium having embodied thereon a computer program for executing a method for thermo-fluid management of a conditioned space having a plurality of components, the method comprising:
obtaining a data input file comprising conditioned space data associated with the conditioned space;
automatically generating a 3D geometry of the conditioned space in a format suitable for a mesh generation model for numerical analysis, wherein automatically generating the 3D geometry for numerical analysis comprises:
parsing the conditioned space data to obtain a geometrical data associated with the plurality of components of the conditioned space, wherein the geometrical data represents the plurality of components by a plurality of points, a plurality of lines and a plurality of surfaces with corresponding naming conventions,
creating, based on the parsed geometrical data, the 3D geometry of the conditioned space having the plurality of components in the format suitable for a mesh analysis;
creating a mesh within the 3D geometry using the mesh generation model;
generating simulation data based at least on an operational data of the plurality of components, the operational data representative of operational specifications of the plurality of components; and
applying the simulation data on the mesh to simulate a thermo-fluid model of the conditioned space,
wherein creating the 3D geometry comprises obtaining a plurality of corner points from a plurality line pairs selected from the plurality of lines, and arranging each corner point of the plurality of corner points in an order of appearance in the conditioned space based on an identification of a nearest point in a direction corresponding to the each corner point.

* * * * *